United States Patent
Chang et al.

(10) Patent No.: US 7,166,822 B1
(45) Date of Patent: Jan. 23, 2007

(54) COOKING APPARATUS EMPLOYING CENTRALLY LOCATED HEAT SOURCE

(76) Inventors: Peter Chung-Yuan Chang, 6469 Flanders Dr., San Diego, CA (US) 92121; Steven Chang, 6469 Flanders Dr., San Diego, CA (US) 92121

( * ) Notice: Subject to any disclaimer, the term of this patent is extended or adjusted under 35 U.S.C. 154(b) by 0 days.

(21) Appl. No.: 11/286,248

(22) Filed: Nov. 22, 2005

(51) Int. Cl.
*H04B 3/06* (2006.01)

(52) U.S. Cl. .............. 219/521; 219/432; 219/438; 219/430; 99/331; 99/448; 99/483

(58) Field of Classification Search ........... 219/521, 219/400, 430, 432, 438; 99/330, 331, 339, 99/413, 448, 483
See application file for complete search history.

(56) References Cited

U.S. PATENT DOCUMENTS

| | | | |
|---|---|---|---|
| 3,662,155 A * | 5/1972 | Komazaki et al. .......... 219/432 |
| 4,214,517 A | 7/1980 | Caldwell | |
| 4,439,668 A * | 3/1984 | Wells .................. 219/438 |
| 4,591,698 A * | 5/1986 | Chang ................. 219/400 |
| 5,057,331 A | 10/1991 | Levinson | |
| 5,092,229 A | 3/1992 | Chen | |
| 5,235,904 A * | 8/1993 | Ludena ................. 99/413 |
| 5,429,039 A * | 7/1995 | Chang ................. 99/331 |
| 5,575,198 A | 11/1996 | Lowery | |
| 5,794,525 A | 8/1998 | Fan | |
| 6,130,416 A | 10/2000 | Gabbai | |
| 6,173,643 B1 * | 1/2001 | Qian et al. ............ 99/339 |
| 6,196,115 B1 * | 3/2001 | Tsao ................ 99/339 |
| 6,283,014 B1 * | 9/2001 | Ng et al. ............. 99/330 |
| 6,320,166 B1 | 11/2001 | Park | |
| 6,575,082 B1 | 6/2003 | Liao | |
| 6,849,830 B2 | 2/2005 | Damiano et al. | |
| 7,075,038 B2 * | 7/2006 | McDuffie ............. 219/430 |

* cited by examiner

*Primary Examiner*—Robin Evans
*Assistant Examiner*—Leonid Fastovsky
(74) *Attorney, Agent, or Firm*—Donn K. Harms

(57) ABSTRACT

A device for heating and warming food featuring a base with a central member axially projecting it surface which provides heat from its exterior surface. The base is cooperatively engageable with one or a plurality of cooking containers having central cavities adapted to frictionally engage the central member thereby heating food in the containers from a central axis. Secondary cooking containers are engageable to axial projections in the primary cooking contains to allow two foods to be heated at the same time from a central area.

21 Claims, 3 Drawing Sheets

COOKING APPARATUS EMPLOYING CENTRALLY LOCATED HEAT SOURCE

FIELD OF THE INVENTION

The present invention relates to food heating and cooking devices. More particularly, the present invention relates to a device having a controllable heating element and a removable food container or pot having a central cavity with an inner surface which contacts food during cooking to thermally transfer the heat energy to the food from a central heat source. The base employs a heating element dimensioned for engagement to one or a plurality of pots having central cavities adapted for such engagement thereover. Optionally a second cooking or heating vessel is provided for engagement inside the first in a mount situated above the heating element to thereby provide a second container in which a second food may be cooked or warmed.

BACKGROUND OF THE INVENTION

The preparation of food has long relied on the use of heat to improve the taste, consistency and nutritional qualities of the ingredients used to create a meal. Obvious early examples of cooking would include the spit over the wood campfire and later the grill. Ultimately the oven and pots and pans evolved to hold various foods during heating.

The invention of the pot several thousand years ago marked a great step in the simplification of food preparation as it provided a means to easily combine disparate items and then to better control the time and temperature at which a recipe would be maintained to produce the desired culinary results. Naturally, over time, this basic contained heating concept has evolved into numerous pot designs including pressure cookers, steamers and double boilers and often these approaches involve various valves, regulators and other complicated control mechanisms.

One of the most significant components of this evolution toward simplification of the cooking process has been the change in methods used to provide the heat source. Starting with wood, such heat sources evolved to the use of natural gas and then from hydrocarbon based heat to electrically generated thermal energy. Until recently, most versions of the electrically heated devices relied on directly heating an element of metal such as a Nichrome wire or sheet surrounding the container. The electrically powered element is heated to an appropriate temperature which is then conductively transferred to a pot situated on top of or over the element. The food contents of the container are thus heated by the electrical element by heat communicated through the bottom of the container wall defining the pot or pan. This methodology of heating from the outside of the pot to transmit heat to the inside or core of the food therein tends to produce uneven results. The outer surface of the food material may be too hot or even crisped while the center remains cool or uncooked.

In addition to the uneven cooking issue, most approaches to the problem incorporate the electronic controls and heating elements outside the containment component of the device which holds the food container. An example of such is the ubiquitous "crock pot" which features a ceramic bowl adapted for engagement within a surrounding containment component. Further, more often than not these devices are capable of heating only one component of a meal at a time.

PRIOR ART

The prior art cited below describes examples of attempts to provide for some or all the above-noted capabilities but, as shall be seen, each falls short of completely achieving these goals.

U.S. Pat. No. 4,214,517 (Caldwell) describes a device for cooking bread articles such as buns wherein the bun is formed with a cavity within. A heated central die is one-half of the heated mold used to create the bun. Though this principle does assist in the production of evenly cooked commercial hot-dog buns, it does not lend itself to the preparation of other foods that do not have a specific physical configuration. Additionally, the construction of the device complicates the necessary cleaning subsequent to use.

U.S. Pat. No. 5,092,229 (Chen) depicts an "entirely uniformly heated responsive cooker." This invention, composed of a myriad of containers, vessels, valves, regulators and gaskets, is intended to evenly cook many foods by equalizing the pressure and temperature of the material during the cooking process, much like a pressure cooker. Though successful in this regard, the device is overly complicated mechanically as it is composed of a plurality of small parts, is likely to require training to operate, is difficult to clean and is expensive as a result of the complexities of manufacture. Additionally, the potential of user exposure to super-heated steam during the cooking process is a well known hazard of such pressure cooking systems.

U.S. Pat. No. 5,794,525 (Fan) teaches a cooking device comprising a heater which receives and supports thereon a food container which is adapted to receive and hold therein food to be cooked. The food container comprises a cylindrical casing having a top opening and a bottom on which a raised portion with a steam passage extending therethrough is formed. The steam passage has an exit opening at a location higher than the top opening of the casing. A cover is provided to close the open top of the casing. The heater comprises a container-like base inside which a water vessel is provided to receive and contain therein a predetermined amount of water. A heating element is provided around the water vessel to heat the water therein for generation of steam. As can be seen, this mechanism lacks a heat source in the central core and requires the use of water to provide heat to the vessel. The necessity to provide water as a basis for heat transfer limits the use of the device in any capacity other than that of a food steamer. There also is the potential for fire if the water level were to drop sufficiently due to evaporation.

U.S. Pat. No. 6,130,416 (Gabbai) portrays a food heating device such as a sandwich toaster or contact grill comprising two hingedly connected parts upon which heating elements, fixed within heat distribution bodies, are mounted. Detachable contact plates against which the food is heated are arranged to abut the heat distribution bodies via complementary curved contact surfaces to provide improved heat distribution. As proposed, this device evenly heats and toasts sandwiches or can serve as a contract grill for other foods. The lack of a pot or container and resulting inability to create meals such as stews, roasts, soups and casseroles is inherent in the design. The detachable contact plates are prone to loss and their removal may require additional tools. There is no central heating of the food as the device conducts heat from the outer to the inner surfaces.

U.S. Pat. No. 6,320,166 (Park) outlines a covered cooking pot type of apparatus having a double-layered wall structure which enables a heat conductive medium filling a cavity format between the double-layered structure by an electrical heating element. Beyond the cost adding complexities of manufacturing the envisioned silicon oil filled, double-walled cooking device, the potential for accidental discharges of 500 degree Fahrenheit oil from the valved internal cavity appears to be a reasonable cause for concern. There is no provision for centrally heating the food as the conducting fluid is contained around the circumference of the container.

U.S. Pat. No. 6,575,082 (Liao) relates to an air roaster for placement in a barbeque. Though this device recognizes the concept of funneling heat to the center of the food to reduce cooking time, the invention lacks a centrally located heat source that is engageable to one or a plurality of pots and it is to be used primarily on a barbeque which of course does not lend itself to be easily used on a stove or sink countertop.

Accordingly, there exists an unfilled need for a temperature controllable, electrically driven device for the cooking of food that employs a centrally located heat source to heat the food more evenly from inside to outside. Such a device should be safe to operate by not requiring boiling water, steam pressure or super heated internal conductive fluids. Still further, such a device should provide a central heat source adapted to engage with one or a plurality of cooking pots and heat food in any of the engaged pots from the center. Additionally, such a device should occupy a small footprint on the sink and should provide the ability for multiple containers in the same pot that can heat or cook more than one item of an ad-hoc meal concurrently.

SUMMARY OF THE INVENTION

The device herein described and disclosed provides a food preparation apparatus featuring a base with an elevated heat source that is adapted for central location elevated within an internal cavity of a pot engaged upon the base. The device features one or a plurality of cooking vessels or pots each having a centrally located internal cavity. Each of the pots is adapted for operative engagement with a base having a centrally elevated heat source adapted to engage with the central cavity located in one or a plurality of cooking pots. Any pot so engaged with the base will operatively heat food from the central portion of the pot when so engaged. The pot features a sidewall engaging a bottom wall which communicates with a central wall thereby defining a first food cooking cavity within the pot. The central wall defines a central cavity situated around the central axis of the pot. This central cavity is dimensioned to removably engage over a similarly shaped heating element elevated from a base.

The base has a top surface adapted to provide engagement with, and support of, the bottom wall of the pot. The base also features a controllable heating element in a position that is elevated above the top surface of the base and positioned to be substantially centrally located, inside the central cavity, when the pot is engaged to the base. When so engaged, food inside of the first food cavity of the pot will be heated from a centrally located heat source.

In another preferred mode of the device, optionally located inside the first cooking cavity of the primary vessel is at least one additional auxiliary cooking cavity designed to hold a separate portion of food or sauce from that contained in the first cooking cavity. The additional cooking cavity is positioned to be located around the center axis of the pot and directly over the cental cavity when the pot is operatively engaged with the base providing the ability to prepare multiple components of a meal concurrently.

In a preferred mode of the device, there can be a variety of pots of different sizes and/or shapes, each of which would have a centrally configured central cavity adapted for engagement over the heat source elevated from the center of the common base. This would allow for large, small, tall and short pots to be used with the same base, much like a food processor engages different tops and components.

The controllable heating element component engaged with the base would be made of thermally conductive material such as aluminum, steel, ceramic or a composite. The heating element is dimensioned to fit within the internal cavity of the engageable pots which would be heated electrically through commonly known techniques and materials such as resistance within metallic filaments or serpentine Nichrome wires or proprietary heat generating devices like ATC and PTC thermistors.

In another preferred mode of the device, optionally, additional heating elements can be placed in or below the top planar surface of the base so that the cooking cavity provided by the primary vessel can be heated from both the bottom and the center to speed the cooking of the contents. The temperature of both the lower and central heating elements would best be controlled separately to allow for even cooking. Optionally, a separate heat reflecting component can be provided in order that when the pot is removed and replaced with the reflecting component the device can be used as a space heater.

Accordingly, it is the object of this invention claimed herein to provide a pot for heating food that communicates heat to the food from a centrally located heat source.

It is another object of this invention to provide such a food cooking vessel which employs a base with an elevated heating element adapted to engage one or a plurality of pots so that the heating element is centrally located within the cooking vessel when so engaged.

It is still another object of this invention to provide such a pot engageable to a base and that optionally contains a plurality of food cooking chambers to allow for simultaneous cooking of a plurality of different segregated foods by the centrally located heating element.

It is an additional object of this invention to provide such a pot that optionally will also heat food from the bottom concurrently with heat from the center.

With respect to the above description, before explaining at least one preferred embodiment of the invention in detail, it is to be understood that the invention is not limited in its application to the details of construction and to the arrangement of the components or steps set forth in the following description or illustrated in the drawings. The apparatus forming the invention is capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the objects and claims be regarded as including such equivalent construction and methodology insofar as they do not depart from the spirit and scope of the present invention. Further objectives of this invention will be brought out in the following part of the specification, wherein detailed description is for the purpose of fully disclosing the invention without placing limitations thereon.

BRIEF DESCRIPTION OF THE DRAWING FIGURES

The accompanying drawings which are incorporated in and form a part of this specification illustrate embodiments of the disclosed processing system and together with the description, serve to explain the principles of the invention.

DETAILED DESCRIPTION OF PREFERRED EMBODIMENTS OF THE DISCLOSED DEVICE

With reference to the drawings shown in FIGS. 1–4, various preferred modes of the disclosed cooking device 10 are shown.

Figure 1:
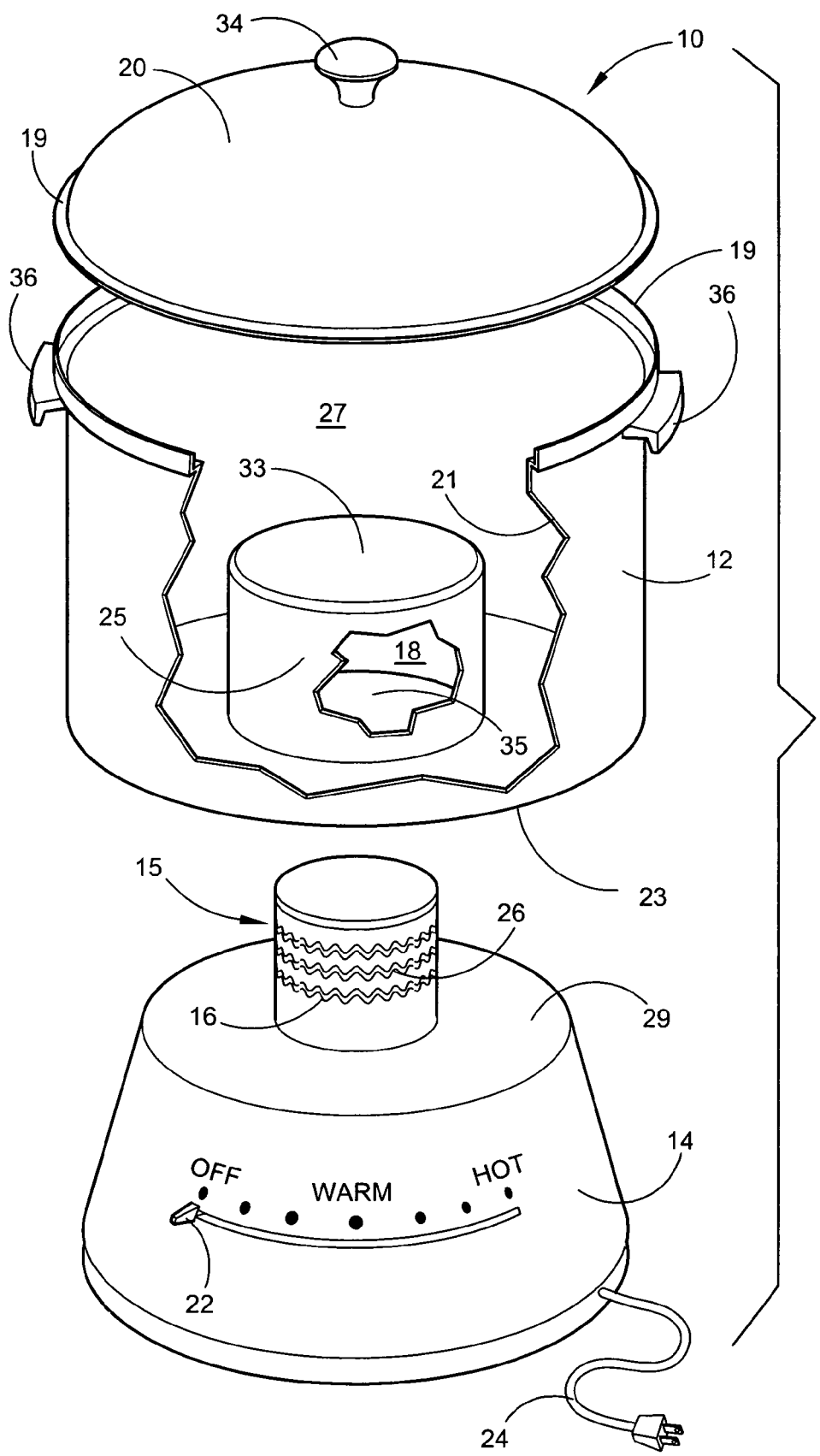
FIG. 1 is an exploded side view of the device and basic functional components

As can be seen in FIG. 1, the cooking device 10 of the present invention comprises a cooking container 12 possessing a central located internal cavity 18 adapted in dimension to operatively engage and surround a central component 15 member axially rising from a base 14. As shown in FIG. 1, the central component 15 providing the mount for the heating element 16, has a generally cylindrical shape and engages a similarly shaped mirrored image cavity formed on the cooking container 12. This configuration is similar on all of the cooking containers 12 or pots that engage the base 14 as a heat source and thus allows the device to be employed as a kit with one heat source being interchangeably engageable with a plurality of pots or cooking containers 12 having an internal cavity 18 adapted to this engagement.

Figure 2:
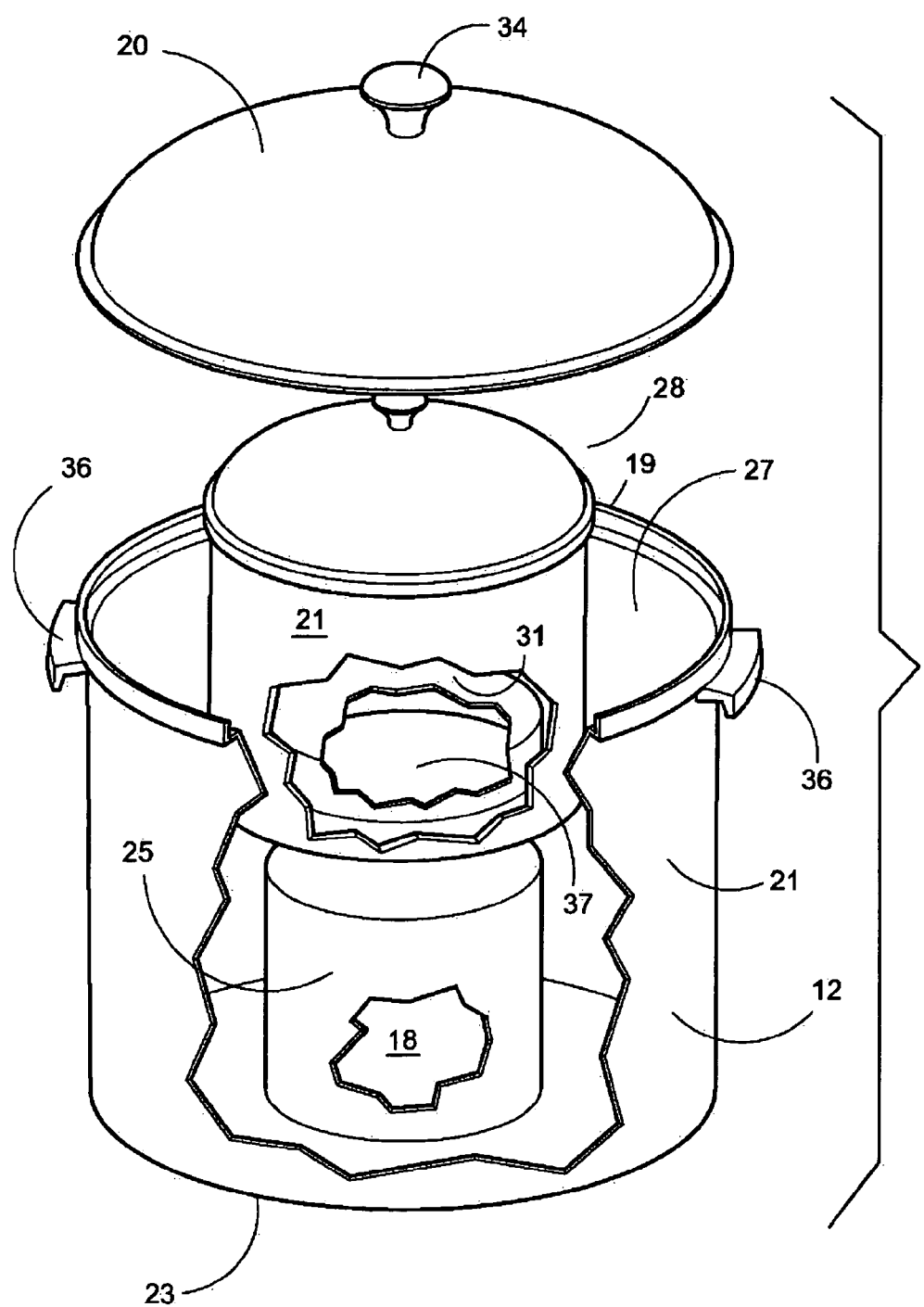
FIG. 2 depicts an internal side view of a second type of cooking vessel employed with the device on the interchangeable base.

As shown in FIG. 2, an internal side view of another particularly preferred mode of the device 10 features a cooking container 12 having a first cooking cavity 27. The cooking container features a cylindrical casing formed by the sidewall 21 and has an opening on the top side defined by a circumferential top edge 19 of the sidewall 21 thereby providing the opening for the entry and removal of food in the cooking cavity 27.

In the cooking container shown in FIG. 2 as well as in all preferred modes of the device 10, the cooking container 12 features a sidewall 21 engaging a bottom wall 23 which communicates with a central wall 25 thereby defining the volume of the first cooking cavity 27 within the cooking container 12. The central wall 25 which engages a topwall 33 defines an internal cavity 18 situated around the central axis of the cooking container 12 having an aperture 35 in the center portion of the bottom wall 23 of the cooking container 12. This internal cavity 18 is dimensioned to removably engage over a similarly dimensioned central component 15 having a heating element 16 which is elevated from a planar support surface 29 on the base 14 which supports the cooking container 12 thereon.

Using this configuration, any cooking container 12 in a kit of cooking containers having an internal cavity 18 dimensioned to engage with a single base 14, will easily engage to the base 14 for cooking, or to keep food warm at the table, and disengage from the base 14 for cleaning when the cooking container 12 is used to serve food separate from the base 14. Small cooking containers 12, large ones, or specially configured cooking containers 12, would all use the same means to engage the base 14 with an elevated centralized heat source and all would enjoy the aforementioned benefits of the centrally or axially located heat source to cook or warm food placed in the cooking container 12 chosen.

The cooking container 12 shown in FIG. 2 is an especially preferred embodiment of the device 10 and has the internal cavity 18 dimensioned for cooperative engagement over the heating element 16 rising above the base 14 for axially elevated transfer of heat therefrom to the food inside the container. This allows for the heat source to be centrally located to cook or warm the food in the first cavity 27 from a center point in the cooking container 12 which is also elevated from the bottom wall 23 to cook or warm more evenly.

In this embodiment, the top wall 33 of the internal cavity 18 terminates well below the cover 20 and the top edge 19 of the food container 12. This spacing arrangement allows for the engagement of a secondary container 28 over internal cavity 18 with that secondary container 28 providing a secondary cooking cavity 31. This secondary container 28 may be permanently engaged to the top or distal end of the projection of the internal cavity 18. Or in a particularly preferred mode of the device 10, the secondary container 28 can be removably engageable by frictional or other means of removable engagement to a mount over the topwall 33. The engagement of the secondary container 28 is the same as the primary container 12 on the base 14 in that a center cavity 37 communicates with the bottom surface of the secondary container 28 and is dimensioned for cooperative engagement around the distal end of the projection of the internal cavity 18 formed by the central wall 25, and which houses the elevated centrally located heat source of the base 14. If removable, the secondary container 28 may be engaged to cook during cooking times, and disengaged and used as a separate service device during the meal. If the device 10 is employed to serve the meal and concurrently keep the food warm, the secondary container 28 is especially useful to hold a separate food such as a sauce or condiment or second food related to a first food in the first cavity 27, segregated from the main container. The food in the secondary container 28 would be kept warm during the meal if maintained in position around and above the internal cavity 18.

If permanently engaged, the secondary container 28 may be positioned in one cooking container 12 of a kit of cooking containers 12 all adapted to engage the base 14 while another cooking container 12 from such a kit adapted to engage the base might not have the secondary container 28. If removably engageable, the secondary container 28 would simply be engaged above the closed top wall of the internal cavity 18 using frictional engagement or other means for temporary engagement thereon. Also if removable, the secondary container 28 can be engageable to any of the plurality of cooking containers 12 adapted for engagement with the base and having a central wall 25 sized to engage the secondary container. This allows the secondary container 28 to be transferable amongst the different cooking containers 12 in the kit, as needed. In all modes of the device 10 having a secondary container 28 in the cooking container 12, the central wall 25 forming the internal cavity 18 is centered within the casing of the food container 12 to allow for a centered mount of the secondary container 28. Handles 34 and 36 may be provided for manipulation of the container 12 and the top 20 prior to, during, and subsequent to the cooking process. It is also preferred that the height of the secondary container 28 be such that when engaged inside the cooking cavity 27, the cover 20 may still be engaged.

Figure 3:
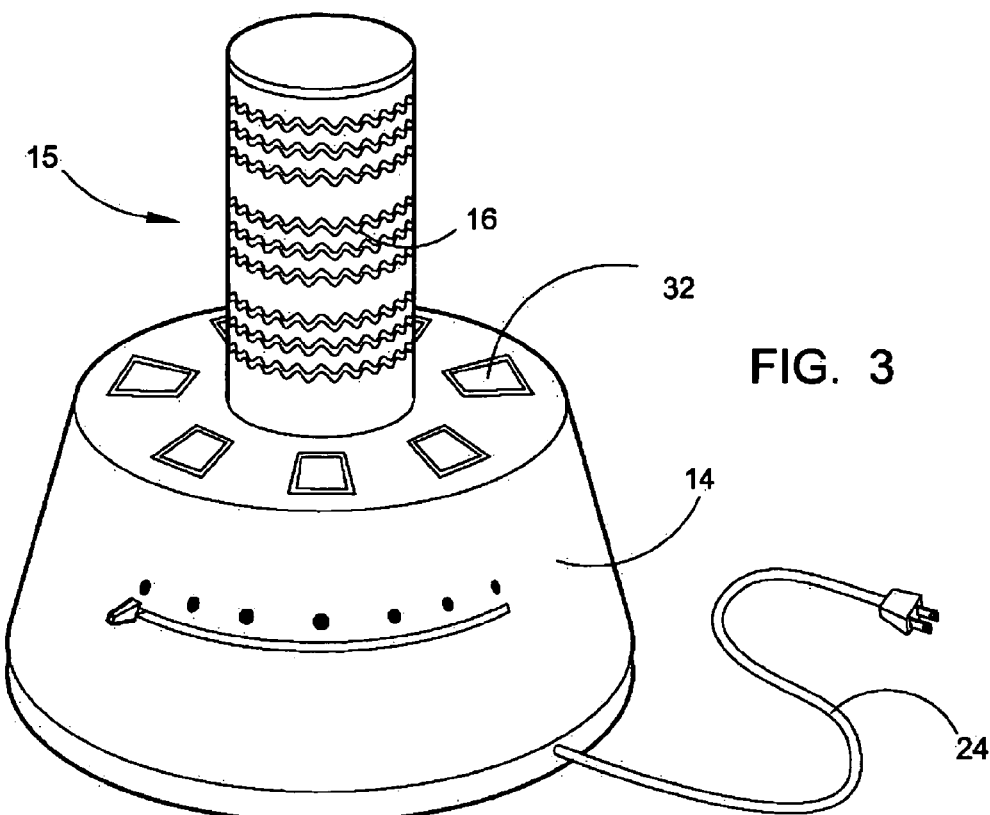
FIG. 3 is a side perspective view of the device utilizing a cylindrically shaped vessel engagement component and having a second means for heating an engaged pot.
Figure 4:
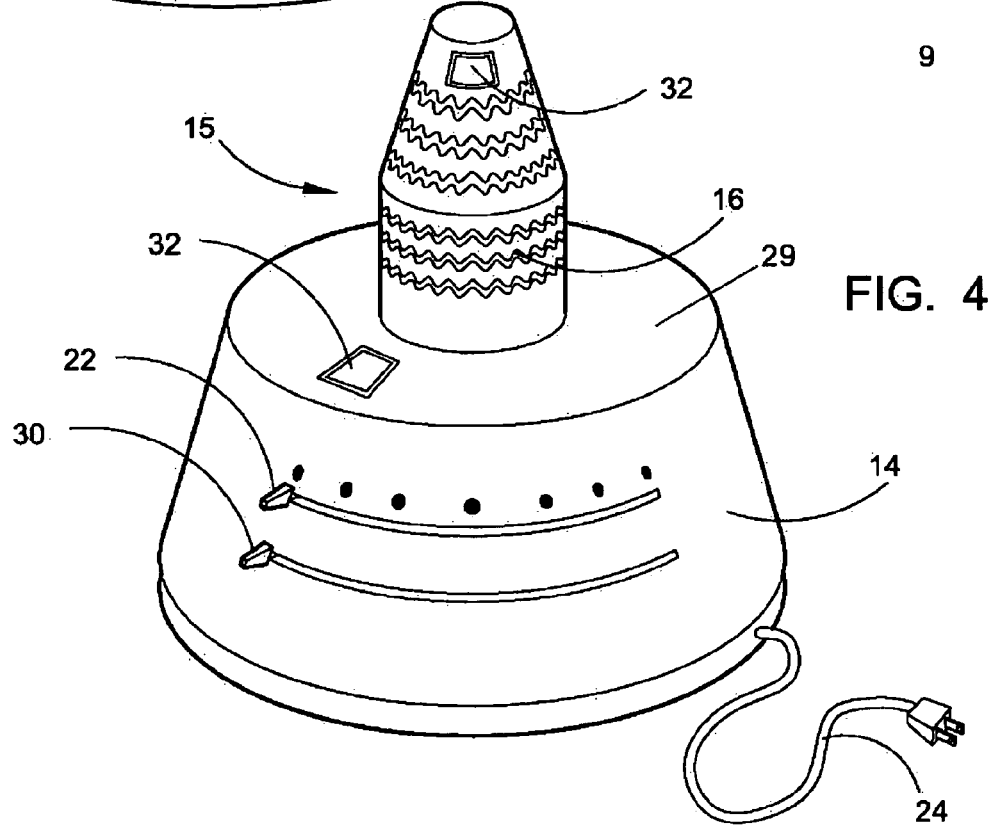
FIG. 4 is a side perspective view of the invention utilizing a conically shaped vessel engagement component.

In FIG. 4, in another especially preferred mode of the device, experimentation has found that if the central component of the heating element 16 is dimensioned having a conical exterior dimension at an upper area of the heating element 16 which transmits heat from the mounted heating element 16 though a similarly shaped central cavity 18 of an engaged cooking container 12, it will impart heat to the center of food housed in the cooking container 12 in a more diffused fashion which is preferable. Such a conical shape also provides more surface area for contact and heat transmission than a straight surface such as shown in FIG. 3. Additionally, if a secondary container 28 is employed, it would have an internal cavity 18 dimensioned with a mating conical slant thereby making for an easy mount of the secondary container 28 since it would self-center and more contact for heat transmission. This diffusion is provided by the angled walls of the upper surface area of the heating element 16 being able to contact the similarly shaped central cavity 18 and diffuse the transferred heat over an angled and larger surface area.

The central component 15, is shown in a cylindrical shape in FIGS. 1 and 3 and in an especially preferred conical shape in FIG. 4; however, those skilled in the art will no doubt realize that various other shapes are employable so long as the dimensional characteristics of the central component 15 are adapted to engage with and transmit heat to the central cavity 18. Consequently all such variations of the dimensional characteristics of both components are anticipated. When a secondary container 28 is to be employed, the conical shape or an especially elongated shape of FIG. 3 allows for the secondary container to have more contact for heat transmission.

Engageable with a top edge of the sidewall 21 the shown cooking containers 12 herein is a removable top 20 or lid which may be engaged to cover the cooking cavity 27.

The base 14 provides a mount for the central component 15 which provides a mount for an elevated heating element 16 adapted to be centrally located in an engaged cooking container 12. The base 14 also provides removably engageable support for the food container 12 on the generally planar support surface 19. The heating element 16 is engaged upon the central component 15 such that the resulting heat transmitted to the cooking container 12 is in a substantially central location and elevated above the bottom wall 23. The heating portion of the central component may encompass all of it, or preferably it will be spaced slightly from the support surface 29 to more centrally locate the heat source for food being cooked inside the first cooking cavity 27.

Heat from the heating element 16 can be provided by one or a combination of means for heating employing electrically energized heating components such as resistive heating elements 26 or in a particularly preferred mode of the device 10 thermistors 32. A means for temperature control such as variable control 22 and means for timing of cooking such as timer 30 provide more accurate cooking capabilities. A thermostatic control (not shown) can also be employed to maintain the heating elements 26 at a constant temperature. This would be especially convenient if the device 10 is used to warm food being served, or if the device is required to maintain a certain temperature for a duration of cooking time. The thermostatic control would cut electrical power to the heating elements 26 or thermistors 32 when the temperature exceeds a preset point set on the variable control 22. Electric power is supplied to the device via an electrical cord and connector 24 adapted to engage with an electrical power supply.

The base 14 through means of electrical energy supplied to the heating element 16 communicated from the power cord 24 provides electrically generated thermal energy which is then conducted into the food container 12 through means of the engagement of the internal central cavity 18 and central component 15 providing the mount for the heating element 16. Food in the cooking cavity 27 is thereby heated from a central point in the cooking container 12.

During use the food container 12 receives and holds food to be cooked therein in the cooking cavity 27 and is generally covered by the top 20. The cooking container 12 is supported on the top support surface 29 of the base 14 and is retained in place by the engagement of the receiving cavity 18 having an exterior dimension similar to the exterior dimension of the central component 15. It is best if the dimensional characteristics of both close to allow a smooth engagement and disengagement and to allow for maritinum thermal transmission.

Although the invention has been described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention. Any and all such changes, alternations and modifications, as would occur to those skilled in the art, are considered to be within the scope of this invention as broadly defined in the appended claims.

Further, the purpose of the attached abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A cooking apparatus for food comprising:

a base, said base having a top surface;

a central member axially projecting from an engagement end on said top surface, to a distal end;

said central member having an exterior dimension defined by a sidewall engaging an upper surface at said distal end;

means for radiating heat positioned on said exterior of said central member;

at least one cooking container, said cooking container having a cooking cavity defined by a sidewall extending from a bottom wall to an open end opposite said bottom wall;

a central cavity, said central cavity having an internal dimension defined by a center wall engaging said bottom wall about the circumference of an aperture communicating through said bottom wall, said internal cavity extending to a top wall at a distal end of said center wall;

said center wall extending to said top wall also defining an internal member axially projecting into said cooking cavity from said bottom wall to a distal end of said internal member; and said internal dimension of said central cavity adapted for cooperative removable engagement with said exterior dimension of said central member, whereby said cooking container is removably engageable upon said base with said central member operatively engaged in said central cavity and food placed in said cooking cavity is heated by heat radiated from said central member occupying said central cavity.

2. The cooking apparatus of claim 1 additionally comprising:

a plurality of said cooking containers in a kit of different sizes of said cooking containers, each of said plurality of cooking containers being removably engageable with said base.

3. The cooking apparatus of claim 1 additionally comprising:

a secondary cooking container having a cooking cavity defined by a side surface extending from a bottom surface;

said secondary cooking container having a center cavity communicating with said bottom surface; and said center cavity dimensioned for cooperative engagement on said distal end of said internal member, whereby said secondary cooking container is engageable upon said internal member.

4. The cooking apparatus of claim 2 additionally comprising:

at least one secondary cooking container having a cooking cavity defined by a side surface extending from a bottom surface;

said secondary cooking container having a center cavity communicating with said bottom surface;

said center cavity dimensioned for cooperative engagement on said distal end of said internal member, whereby said secondary cooking container is engageable upon said internal member of any of said plurality of cooking containers in said kit.

5. The cooking apparatus of claim 1 additionally comprising:

said internal dimension of said central cavity being dimensioned as substantially negative image of said exterior dimension of said central member whereby a contact surface is maximized to thereby maximize heat transmission.

6. The cooking apparatus of claim 2 additionally comprising:

said internal dimension of said central cavity being dimensioned as substantially negative image of said exterior dimension of said central member whereby a contact surface is maximized to thereby maximize heat transmission.

7. The cooking apparatus of claim 3 additionally comprising:

a lid adapted for engagement on said sidewall of said cooking container at said open end; and said side surface of said secondary cooking container extending from said bottom surface of said secondary cooking container a determined length so allow said lid to be engaged at said open end when said secondary cooking container is engaged on said internal member.

8. The cooking apparatus of claim 4 additionally comprising:

a lid adapted for engagement on said sidewall of said plurality of cooking containers at said open end; and said side surface of said secondary cooking container extending from said bottom surface of said secondary cooking container a determined length to allow said lid to be engaged at said open end, when said secondary cooking container is engaged on said internal member.

9. The cooking apparatus of claim 1 additionally comprising:

said exterior surface of said central member having a conical shape adjacent to said distal end.

10. The cooking apparatus of claim 5 additionally comprising:

said exterior surface of said central member having a conical shape adjacent to said distal end.

11. The cooking apparatus of claim 6 additionally comprising:

said exterior surface of said central member having a conical shape adjacent to said distal end.

12. The cooking apparatus of claim 1 additionally comprising:

said means for radiating heat positioned on said exterior of said central member extending between a position adjacent to said distal end of said exterior surface and a position above said top surface, thereby heating said food positioned in said cooking container from an axial center section of said cooking container.

13. The cooking apparatus of claim 3 additionally comprising:

said means for radiating heat positioned on said exterior of said central member extending between a position adjacent to said distal end of said exterior surface and a position above said top surface, thereby heating said food positioned in said cooking container from an axial center section of said cooking container.

14. The cooking apparatus of claim 7 additionally comprising:

said means for radiating heat positioned on said exterior of said central member extending between a position adjacent to said distal end of said exterior surface and a position above said top surface, thereby heating said food positioned in said cooking container from an axial center section of said cooking container.

15. The cooking apparatus of claim 8 additionally comprising:

said means for radiating heat positioned on said exterior of said central member extending between a position adjacent to said distal end of said exterior surface and a position above said top surface, thereby heating said food positioned in said cooking container from an axial center section of said cooking container.

16. The cooking apparatus of claim 9 additionally comprising:

said means for radiating heat positioned on said exterior of said central member extending between a position adjacent to said distal end of said exterior surface and a position above said top surface, thereby heating said food positioned in said cooking container from an axial center section of said cooking container.

17. The cooking apparatus of claim 10 additionally comprising:

said means for radiating heat positioned on said exterior of said central member extending between a position adjacent to said distal end of said exterior surface and a position above said top surface, thereby heating said food positioned in said cooking container from an axial center section of said cooking container.

18. The cooking apparatus of claim 11 additionally comprising:

said means for radiating heat positioned on said exterior of said central member extending between a position adjacent to said distal end of said exterior surface and a position above said top surface, thereby heating said food positioned in said cooking container from an axial center section of said cooking container.

19. The cooking apparatus of claim 1 additionally comprising:

means to regulate the temperature of said means for radiating heat.

20. The cooking apparatus of claim 1 additionally comprising:

secondary means for radiating heat positioned on said top surface.

21. The cooking apparatus of claim 3 additionally comprising:

secondary means for radiating heat positioned on said top surface.

* * * * *